(12) United States Patent
Pettersson et al.

(10) Patent No.: US 10,728,538 B2
(45) Date of Patent: Jul. 28, 2020

(54) TECHNIQUE FOR VIDEO QUALITY ESTIMATION

(75) Inventors: Martin Pettersson, Vallentuna (SE); Andreas Rossholm, Malmo (SE)

(73) Assignee: Telefonaktiebolaget L M Ericsson(publ), Stockholm (SE)

( * ) Notice: Subject to any disclaimer, the term of this patent is extended or adjusted under 35 U.S.C. 154(b) by 736 days.

(21) Appl. No.: 13/521,172

(22) PCT Filed: Feb. 1, 2010

(86) PCT No.: PCT/EP2010/000588
§ 371 (c)(1),
(2), (4) Date: Jul. 9, 2012

(87) PCT Pub. No.: WO2011/082719
PCT Pub. Date: Jul. 14, 2011

(65) Prior Publication Data
US 2012/0281142 A1 Nov. 8, 2012

Related U.S. Application Data

(60) Provisional application No. 61/293,764, filed on Jan. 11, 2010.

(51) Int. Cl.
*H04N 17/00* (2006.01)
(52) U.S. Cl.
CPC .................................. *H04N 17/004* (2013.01)
(58) Field of Classification Search
CPC ....... H04N 17/004; H04N 17/00; H04N 26/00
(Continued)

(56) References Cited

U.S. PATENT DOCUMENTS 6,011,868 A 1/2000 van den Branden et al.
6,363,116 B1 * 3/2002 Edwards et al. ......... 375/240.21
(Continued)

FOREIGN PATENT DOCUMENTS

CN 101151904 A 3/2008
CN 101164343 A 4/2008
(Continued)

OTHER PUBLICATIONS

Babich et al. "Video Quality Estimation in Wireless IP Networks Algorithms and Applications". ACM Transactions on Multimedia Computing, Communications and Applications, vol. 4, No. 1, Article 3. Jan. 2008. pp. 3:1-3:18.*
(Continued)

*Primary Examiner* — Zhihan Zhou
(74) *Attorney, Agent, or Firm* — Sage Patent Group

(57) ABSTRACT

An objective video quality estimation technique is disclosed. The technique may be based on a video bitstream model, using parameters taken from the video coding layer of the bitstream for estimating the quality of the video. The technique can be implemented as a method, a computer program, a computer program product, a device, or any one of a server node, a client terminal and a network node comprising the device. As a method embodiment, the technique comprises receiving a video bitstream comprising a series of picture frames; determining an error occurrence in a picture frame of the video bitstream; determining at least one of a temporal propagation and a spatial propagation of the error; and estimating the quality of the video bitstream based on result of the determination.

27 Claims, 10 Drawing Sheets

(58) Field of Classification Search
USPC .................................... 348/553; 375/240.27
See application file for complete search history.

(56) References Cited

U.S. PATENT DOCUMENTS

| | | | |
|---|---|---|---|
| 6,591,396 B1 | 7/2003 | Honda | |
| 2002/0138846 A1 | 9/2002 | Mizutani et al. | |
| 2003/0031128 A1 | 2/2003 | Kim et al. | |
| 2006/0083308 A1 | 4/2006 | Schwarz et al. | |
| 2007/0160133 A1* | 7/2007 | Bao | H04N 19/105 375/240.1 |
| 2007/0160137 A1* | 7/2007 | Guo et al. | 375/240.1 |
| 2007/0237227 A1* | 10/2007 | Yang et al. | 375/240.12 |
| 2008/0165861 A1 | 7/2008 | Wen et al. | |
| 2009/0141166 A1* | 6/2009 | Kim | H04N 19/172 348/425.2 |
| 2009/0153668 A1* | 6/2009 | Kim et al. | 348/180 |
| 2009/0262198 A1 | 10/2009 | Yamagishi et al. | |
| 2010/0067574 A1* | 3/2010 | Knicker et al. | 375/240.12 |
| 2010/0266045 A1* | 10/2010 | Katzur | H04N 19/176 375/240.16 |

FOREIGN PATENT DOCUMENTS

| | | |
|---|---|---|
| CN | 101411208 A | 4/2009 |
| CN | 101448173 A | 6/2009 |
| JP | 2000341688 A | 12/2000 |
| JP | 2002209234 A | 7/2002 |
| JP | 2006157668 A | 6/2006 |
| JP | 2007214991 A | 8/2007 |
| JP | 2008517499 A | 5/2008 |
| JP | 2008211579 A | 9/2008 |
| JP | 2009533008 A | 9/2009 |
| WO | WO 2008/094092 A9 | 8/2008 |
| WO | WO 2009/012297 A1 | 1/2009 |
| WO | WO 2009/012302 A1 | 1/2009 |
| WO | WO 2009050889 A1 * | 4/2009 |
| WO | WO 2010/104432 A1 | 9/2010 |

OTHER PUBLICATIONS

Chinese Office Action Corresponding to Chinese Patent Application No. 201080061198.4; dated May 14, 2014; Foreign Text, 7 pages, English Translation Thereof, 3 pages.

International Search Report, PCT Application No. PCT/EP2010/000588, dated Aug. 19, 2010, 6 pages.

Written Opinion of the International Searching Authority, PCT Application No. PCT/EP2010/000588, dated Aug. 19, 2010, 5 pages.

Notification of Transmittal of the International Preliminary Report on Patentability, PCT Application No. PCT/EP2010/000588, dated Apr. 26, 2012, 16 pages.

Babich et al.; "Video quality estimation in wireless IP networks" ACM Transactions on Multimedia Computing, Communications, and Applications, vol. 4, No. 1, Jan. 1, 2008, pp. 1-18, XP55017551, ISSN: 1551-6857, DOI: 10.1145/1324287.1324290.

Watanabe et al.; "Proposal of new QoE assessment approach for quality management of IPTV Services", NTT Service Integration Laboratories, NTT Corporation, 2008, E-ISBN: 978-1-4244-1764-3, p. 2060-2063.

Written Opinion issued in corresponding Singapore Patent Application No. 201203965-7; dated Sep. 5, 2014; English Translation Thereof, 5 Pages.

Girod et al., "Digital Images and Human Vision", A. B. Watson, Ed. Cambridge, MA: MIT Press, 1993.

Steinbach, et al., "Standard Compatible Extension of H.263 for Robust Video Transmission in Mobile Environments", IEEE Transactions on Circuits and Systems for Video Technology, vol. 7, No. 6, Dec. 1997, pp. 872-881.

"Advanced video coding for generic audiovisual services", Series H: Audiovisual and Multimedia Systems, Infrastructure of audiovisual services—Coding of moving video, ITU-T Recommendation H.264, International Telecommunication Union, Mar. 2005, 343 pages.

Chinese Office Action Corresponding to Chinese Patent Application No. 201610322111.3, dated Apr. 28, 2017, 7 pages.

* cited by examiner

US 10,728,538 B2

TECHNIQUE FOR VIDEO QUALITY ESTIMATION

CROSS-REFERENCE TO RELATED APPLICATIONS

This application is a 35 U.S.C. § 371 national stage application of PCT International Application No. PCT/EP2010/000588, filed on 1 Feb. 2010, which claims priority to U.S. Provisional Patent Application No. 61/293,764, filed 11 Jan. 2010, the disclosure and content of both of which are incorporated by reference herein in their entireties. The above-referenced PCT International Application was published in the English language as International Publication No. WO 2011/082719 A1 on 14 Jul. 2011.

TECHNICAL FIELD

The present disclosure generally relates to a technique for estimating video quality and particularly to a video quality estimation technique on a bitstream basis.

TECHNICAL BACKGROUND

Video is a common media service nowadays and is rapidly gaining popularity among end users. Video delivered over a communication network as a stream of bits can experience communication constraints or problems which can lead to errors such as data loss or data delay. Such errors can cause a degradation in the visual quality experienced by the end users. Often, such visual degradation is revealed as frozen or distorted images.

Quality monitoring is an important operational scheme for service providers to maintain satisfactory Quality of Experience (QoE) of video services. To this end, good techniques are required to accurately and timely assess the video quality, which is by no means a trivial task.

Perhaps the most accurate video quality assessment technique is subjective testing, where opinions of numerous end viewers are collected and based upon which a common view of the quality is formed. However, subjective testing is expensive, manual, time consuming, and in many cases simply not feasible; for example, it is not possible to conduct subjective testing for video quality monitoring in communication networks or set-top boxes. Hence, means must be provided to estimate the subjective quality of video based on objective measurement. This demand has pushed the development of objective video quality assessment techniques. Objective video quality estimation can not only replace subjective testing in assessing video quality, but it can also enable real-time and automatic assessment of subjective quality.

In the context of the present disclosure, words like "estimate", "assess", "measure" are used interchangeably.

In recent years, different models of objective video quality techniques have been proposed and developed. Based on the input parameters used, they can be categorized as perceptual models and parametric models. Parametric models are also known as network layer models.

Perceptual models take the decoded video and sometimes also a reference video as input to the model. For example, for a so called full-reference (FR) model, the input parameters are the pixel data of the source video as well as those of the decoded video. Perceptual models usually feature high accuracy in estimating the video quality, but they are highly complex, time consuming and computational power consuming, which makes them unsuitable for many situations, such as real-time monitoring. Moreover, when a reference video is used in a perceptual model, the model must strive to solve the crucial problem of synchronizing the reference video with the decoded video.

The interest in light-weight video quality models has lead to the recent development of parametric models. A parametric model takes packet header information as input and calculates a quality score based thereon. The network protocol header information is usually taken from one or more of Internet Protocol (IP), User Datagram Protocol (UDP), Real-time Transport Protocol (RTP) and Moving Picture Experts Group 2 Transport Stream (MPEG2TS) layers. Parametric models are relatively uncomplicated in comparison with perceptual models, but the estimation accuracy they can deliver is rather low due to the limited information that can be retrieved from the network protocol headers. For instance, it is very difficult to make a useful estimation of how visible a data loss will be in the decoded video.

SUMMARY

Accordingly, there is a need for an improved technique to objectively estimate, or assess, video quality. As to be seen below, the technique presented herein achieves, among others, a satisfactory accuracy of video quality estimation and at the same time is less complex and consumes few computational resources.

According to a first aspect, a video quality estimation method is provided. The method comprises the steps of receiving a video bitstream comprising a series of picture frames; determining an error occurrence in a picture frame (e.g., determining that an error has occurred in the picture frame as well as the position of the error in the picture frame); determining an error propagation taking into account at least one of a temporal propagation and a spatial propagation of the error (e.g., determining at least one of a temporal propagation and a spatial propagation of the error); and based on the result of the above determination (e.g., the determined error propagation), estimating the quality of the video bitstream. The error may occur due to a delay or loss of information (e.g., due to a delay or loss of a packet, a picture frame, a picture frame partition, etc.). Moreover, the quality estimation step may be based on a scoring scheme.

The method may further comprise a step of determining (e.g., estimating or measuring) a visual degradation caused by the error. In other words, this step is for determining the visibility of the error, or the impact to the video quality caused by the error. Visual degradation is a specific and quantifiable measure for the error visibility. In one embodiment, determining the visual degradation comprises determining a penalty value indicative of the visual degradation caused by the error.

The picture frame may comprise a plurality of partitions (such as but not limited to, pixels, macro blocks, or the like). The error may occur at or affect one or more partitions of the picture frame. In addition, considering a spreading effect, the error which occurs in one picture frame may affect one or more partitions in one or more other picture frames. Accordingly, determining the visual degradation caused by the error may comprise a step of calculating a separate penalty value for each error-affected partition or picture frame. The penalty value is a value indicative of the amount, or the extent, of the visual degradation caused by the error to the video.

The penalty value may be calculated, or assigned, according to a set of rules. The rules may be predefined and are adaptable. Below is a non-exhaustive list of rules for calculating the penalty value:

A higher penalty value is assigned to the error if the error occurs in a scene change (than in the case where the error is an error not related to a scene change);

Motion of or in a picture frame may be used to determine the visual degradation caused by the error. If the video bitstream comprises motion data directly after the error-affected picture frame, a higher penalty value is assigned, and particularly if there is a lot of motion directly after the error and more particularly if the relative magnitude of the motion is large. For example, a small motion error in an otherwise motionless scene will likely be more apparent, i.e. visible, than a medium motion error in a high-motion scene;

No penalty value is assigned to an error-affected partition if the partition is a skip or an estimated skip. An optional exception to this rule may occur if there is a scene change or an estimated scene change;

Decrease the penalty value assigned to the error for at least one of the subsequent picture frames by a predetermined amount or factor. For instance, the penalty value may be decreased by a specific amount or factor for each subsequent picture frame; and The penalty value is reset upon reception of an intra-coded picture frame or an intra-coded partition (e.g., an intra-coded macro block).

Each of the above rules, as well as any other rule, may be selectively implemented in the video quality estimation method. In other words, one may apply any combination of the rules for determining the visual degradation caused by the error.

The series of picture frames may comprise at least one reference picture and at least one prediction picture, wherein the prediction picture comprises at least one motion vector pointing at a position in a reference picture. The temporal propagation and/or spatial propagation of the error may be determined based on the motion vector(s) included in the prediction picture. In one example, the error propagation may be determined by keeping track on the motion vector(s) and the reference picture which the motion vector(s) points out.

The result of the determination, including the partition information and the determined visual degradation, may be arranged, e.g., stored, in a loss penalty map. The loss penalty map may take the form of a two-dimensional data structure such as a table.

The loss penalty map may have the same resolution as the associated picture frame (i.e., as the pixel map of the encoded video). This provides the advantage of presenting the visual degradation in full fidelity. However, if it is intended to lower the complexity of the technique, the loss penalty map has a lower resolution than that of the associated picture frame or pixel map. To this end, the penalty value may be calculated at a lower resolution. For example, the picture frame may comprise a plurality of partitions each of which comprising a plurality of pixels. The partitions may be arranged in the form of a two-dimensional data structure (e.g., as a partition map). In this case, the resolution of the loss penalty map may be arranged the same as that of the partitions map.

To further lower the complexity of the technique, the determination of error propagation, i.e. the determination of at least one of the temporal propagation and the special propagation of the error, may further comprise weighting one or more visual degradation values (e.g. penalty values) determined for a previous error.

In addition to the determination of the error propagation and visual degradation caused by the error, the video quality estimation method presented herein may further aggregate the visual degradation and calculate a (quality) score based on the result of the aggregation. The visual degradation caused by the error may be aggregated over at least one time and space. The calculated score hence serves to indicate the overall quality of the video bitstream.

In aggregating the visual degradation, a weighting algorithm may be used. In one embodiment, the affected partitions or picture frames are aggregated in a uniform way. In another embodiment, a visual degradation of a small value may be weighted at a higher factor than a large visual degradation value.

The aggregation may be performed stepwise in time. For example, visual degradation values may be added up for each second (corresponding to e.g., 25 picture frames) uniformly and then another function is used to take into account these smaller add-up's.

The quality score may be calculated periodically or using a sliding window approach. In one embodiment of the sliding window approach, a new score for a certain window side, i.e., a predefined time duration is calculated at a predefined rate.

The video quality estimation method described above may be based on a video bitstream quality estimation model. The video bitstream may comprise at least a portion of a Video Coding Layer (VCL) which comprises one or more parameters, and at least one of determining the error occurrence, determining the error propagation, and estimating the video quality may be based on at least one or more of the parameters without decoding the video bitstream. The VCL parameters may include partition (e.g., macro block) parameters, intra-coding parameters, motion-related parameters, and so on.

According to a second aspect, a computer program is provided for estimating the quality of a video bitstream comprising a plurality of picture frames. The computer program comprises program code portions which, when run on a computer, cause the computer to perform the steps of the method explained herein. The computer program may be stored on a recording medium which is computer readable and comprised in a computer program product, such as a memory in the form of a hard disk, a ROM, a RAM, an EEPROM or a flash memory.

According to a third aspect, a device for estimating video quality is provided. The device comprises a receiver adapted to receive a video bitstream comprising a series of picture frames, a first determinator adapted to determine an error occurrence in a picture frame, a second determinator adapted to determine an error propagation taking into account at least one of a temporal propagation and spatial propagation of the error, and an estimator adapted to estimate the quality of the video bitstream based on the result of the determination, e.g., the determined error propagation.

The device may further comprise a third determinator adapted to determine the error visibility, or visual degradation caused by the error. Specifically, the third determinator may be adapted to determine the visual degradation by determining a penalty value indicative of the visual degradation caused by the error.

The error may affect one or more partitions of one or more picture frames. Accordingly, the third determinator may be further adapted to determine the visual degradation by calculating a penalty value for each error-affected partition in the video as an indication of the amount, or extend, of the visual degradation caused by the error.

Further, the third determinator may be adapted to calculate the penalty value according to one or more rules which each may be, but is not limited the following:

Assign a higher penalty value to the error if the error occurs in a scene change;

Motion of a picture frame may be used to determine (e.g., estimate or measure) the visual degradation caused by the error. Hence, assign a higher penalty value to the error if the video bitstream comprises motion data directly after the error-affected picture frame and particularly if a relative magnitude of the motion is large;

Assign no penalty value to an error-affected partition if the partition is a skip or an estimated skip. An optional exception to this rule may occur if there is a scene change or an estimated scene change;

Decrease the penalty value assigned to the error for at least one of the subsequent picture frames by a predetermined amount or factor; and Reset the penalty value upon reception of an intra-coded picture frame or intracoded partition.

The third determinator may apply any combination of the rules.

The series of picture frames may comprise at least one reference picture and at least one prediction picture, wherein the prediction picture comprises at least one motion vector pointing at a position in a reference picture. The third determinator of the device may be adapted to determine at least one of the temporal propagation and the spatial propagation of the visual degradation by keeping track on the motion vector and the reference picture which the motion vector points at.

Motion of the error-affected picture frame may be used to determine the visual degradation caused by the error. Hence, the second determinator may be further adapted to determine the visual degradation based on motion vector(s).

The device may further comprise a collector adapted to collect the visual degradation in a two-dimensional data structure derived from the picture frame (e.g., in a loss penalty map).

Further, the device may comprise an aggregator adapted to aggregate the visual degradation caused by the error over at least one of time and space. The device may further comprise a calculator adapted to calculate a score indicative of the quality of the video bitstream based on the result of the aggregation.

The above components of the device, as well as any additional component(s), may be implemented in separate physical units. Alternatively, some or all of the components may be combined into one single physical unit. All the physical units may be arranged within one single housing; but it is also possible to distribute some or all of them in different nodes or terminals participating in the entire video service. Each one of the receiver, the first determinator, the second determinator, the third determinator, the aggregator, the calculator and the estimator may be implemented as specific hardware circuits such as ASICs (Application Specific Integrated Circuits) and/or DSPs (Digital Signal Processors) or as a combination of at least one processor, such as microprocessor, and the computer program mentioned above when it is run on the processor. The computer program may therefore comprise a receiver module, a first determination module, a second determination module, a third determination module, an aggregating module, a calculation module and an estimation module which when run on the processor causes the device to generate perform the corresponding steps mentioned above.

According to a fourth aspect, a server node adapted to provide a video bitstream is provided. The server node comprises the objective video quality estimation device mentioned above.

According to a fifth aspect, a client terminal adapted to decode a video bitstream is provided wherein the client terminal comprises the above-mentioned objective video quality estimation device.

According to a sixth aspect, a network node for communicating between a video server node and the video client terminal is provided. The network node comprises the above-mentioned video quality estimation device.

The video quality estimation technique herein is suitable for estimating the quality of videos encoded in all kinds of techniques, such as the most widely used video coding standards of today, which include H.264, H.263, MPEG-2, MPEG4, etc. The objective video quality estimation technique presented herein may also be suitable for any future video coding standards or techniques.

The video quality estimation technique presented herein is not limited to any specific service. For example, it can be deployed for a wide range of services such as video streaming, mobile television, video telephoning, internet multimedia such as IPTV, video conferencing, and linear television.

BRIEF DESCRIPTION OF THE DRAWINGS

Below, the present disclosure will be described with reference to the embodiments illustrated in the drawings, wherein.

DETAILED DESCRIPTION

In the following, for purposes of explanation and not limitation, specific details are set forth in order to provide a thorough understanding of the objective video quality estimation technique presented herein. It will be apparent to those skilled in the art that the technique may be practiced in embodiments that depart from these specific details. For instance, although the exemplary embodiments are described in connection with the specific network layout of FIG. 1, it can be easily appreciated by those skilled in the art that the technique is equally applicable to network layouts of other types. For another instance, although the exemplary embodiments are explained with reference to video conforming to the H.264, MPEG-2, MPEG-4, or H.263 standard, the objective video quality estimation technique presented herein can be used to estimate the quality of video encoded with all types of codec techniques or standards, including H.264, MPEG-2, MPEG-4, H.263 as well as any other video codec techniques or standards of today and even future video codec techniques. Further, the technique presented herein is not limited to any specific service; on the contrary, it can be deployed for a wide range of services such as video streaming, mobile TV, video telephony, IPTV, video conferencing, linear TV, and more.

Those skilled in the art will further appreciate that the technique explained herein may be implemented with hardware circuits, software means, or a combination of the two. The software means may be in conjunction with a programmed microprocessor or a general purpose computer, using at least one of an Application Specific Integrated Circuit (ASIC) and a Digital Signal Processor (DSP). It will also be appreciated that when the technique is described as a method, it may also be embodied in a computer processor and a memory coupled to the processor, wherein the memory is encoded with one or more programs that performs the method when executed by the processor.

To achieve the objectives mentioned above, i.e. to guarantee both low-complexity and satisfactory estimation accuracy, a video quality estimation technique is hereby presented to perform the quality estimation based on not only network protocol header information (such as those used in parametric models) but also certain parameters from the video coding layer of the video bitstream. Accordingly, it can be said that the technique is based on the bitstream model. This technique has the potential of estimating the video quality with higher accuracy than conventional parametric models while still being lightweight such as to be suitable for video quality monitoring of all kinds, particularly real-time monitoring.

Figure 1:
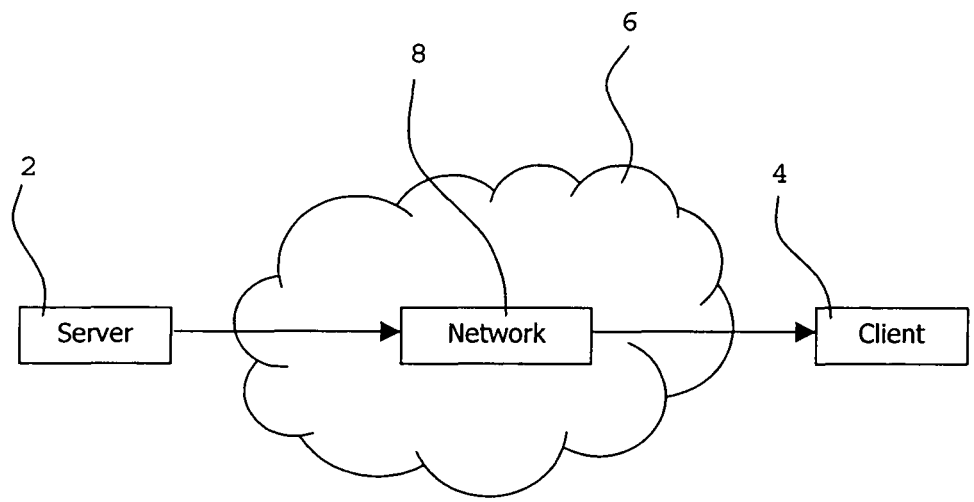
FIG. 1 is block diagram illustrating a system embodiment of the video quality estimation technique.

FIG. 1 is block diagram illustrating a system embodiment of the video quality estimation technique presented herein. As shown in FIG. 1, a video bitstream is transmitted from a video server 2 over to a video client terminal 4 via a communication network 6. At least one network node 8, or "intermediate" node, resides in the communication network and participates in the video transmission. Upon arrival at the client terminal 4, the video is decoded for display to the end user.

The video quality estimation technique can be implemented in various nodes or terminals. For instance, it may be implemented in a server node which provides a video bitstream. The server node may be a node, such as the video server 2 in FIG. 1, for transmitting the video bitstream to one or more client terminals 4 or intermediate nodes 8 in a communication network 6. As a specific embodiment, the server node may be a mobile terminal, a broadcasting TV server, a video-on-demand server or a general purpose computer. capable of transmitting video streams. The video quality estimation technique may be also be implemented in a client terminal, such as the client terminal 4 in FIG. 1, which can decode a video stream. The client terminal may be a mobile terminal, a computer, a set-top-box, a gaming device, a TV set or the like. Further, the technique may be implemented in a network node, such as the network node 8 in FIG. 1, for communicating between a video server node 2 and a video client terminal 4. Even further, the constituting functions of the technique may be distributed across several nodes or terminal, such as any combination of one or more server nodes, one or more network nodes, and one or more client terminals. As a particular embodiment, the technique may be implemented such that bitstream parameters are extracted from at least one of a server, a network node, and a client terminal, while the processing of the parameters is carried out in yet another node or terminal. Last but not least, the technique may also be used in less time constraint embodiments such as content production.

As mentioned above, the input to the bitstream model includes parameters extracted from the video coding layer. To better understand these parameters, a brief explanation to the construction of video coding layers is firstly presented with reference to FIGS. 2 to 5, which illustrate exemplary video coding layers structured according to certain video codec standards of today, such as H.264, MPEG-2, and H.263.

The most widely used video coding standards today, such as H.264, MPEG-2 and H.263, all use a partition based approach. In a partition based video codec, each video picture (can also be referred to as "video frame", "picture frame", or simply "picture") is divided into smaller partitions, termed by some as blocks, such as macro blocks (MBs). For the codec standards mentioned above, the size of a macro block is usually defined as 16×16 pixels. Of course, a partition can take any other proper size.

The pictures in the video codec standards mentioned above can be of three different types: intra coded (I-picture), predictive coded (P-picture) or bi-predictive coded (B-picture). I-pictures may only use information from the current picture for data compression, allowing them to be used as random-access-points in the video, ensuring that a potential error preceding the I-picture is refreshed (To ensure a total refresh in H.264 only one reference picture used for predicting P- and B-pictures should be kept in the buffer; alternatively, an IDR picture could be used instead of the I-picture). P-pictures may predict from one reference picture for each prediction. B-pictures may use two different reference pictures for each prediction. Pictures are ordered in groups of pictures (GOPs), where the GOP usually starts with an I-picture and ends at the picture preceding the next I-picture.

Figure 2:
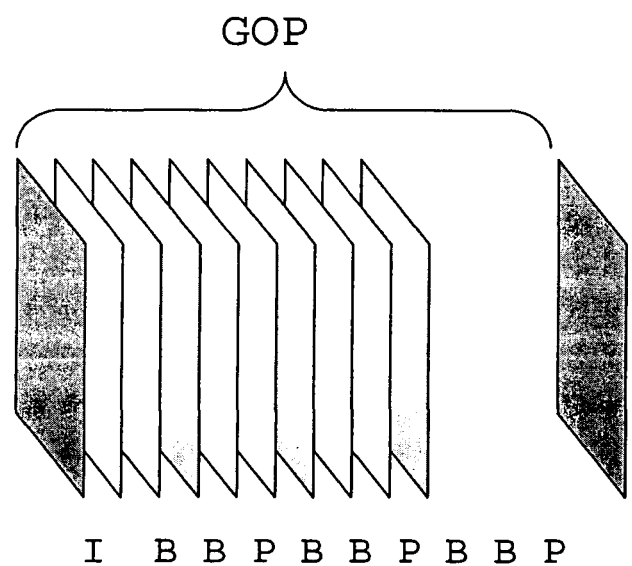
FIG. 2 shows the structure of an exemplary video coding layer.

FIG. 2 illustrates an example of a GOP-structure including I-, P- and B-pictures.

Figure 3:
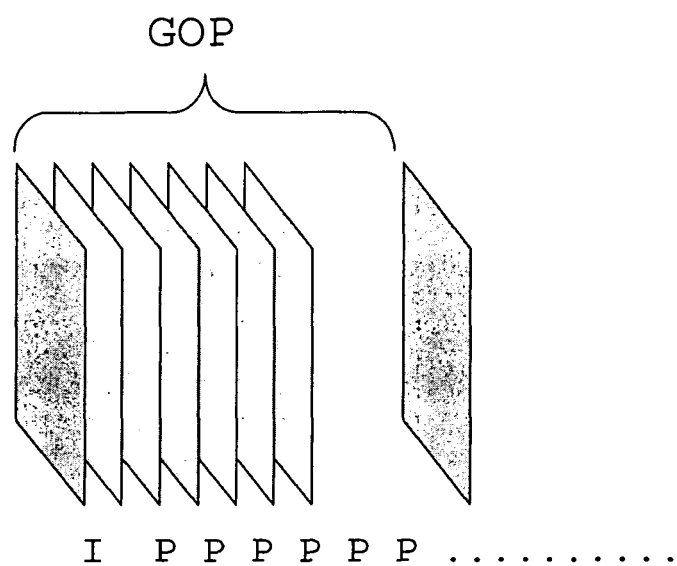
FIG. 3 shows the structure of another exemplary video coding layer.

FIG. 3 illustrates an example of a GOP-structure containing only I- and P-pictures.

Figure 4:
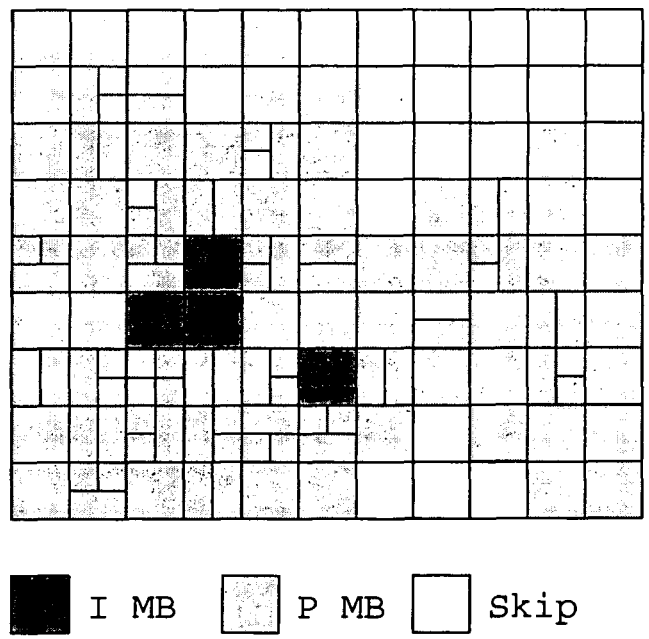
FIG. 4 shows the structure of an exemplary inter-coded picture frame.
Figure 5:
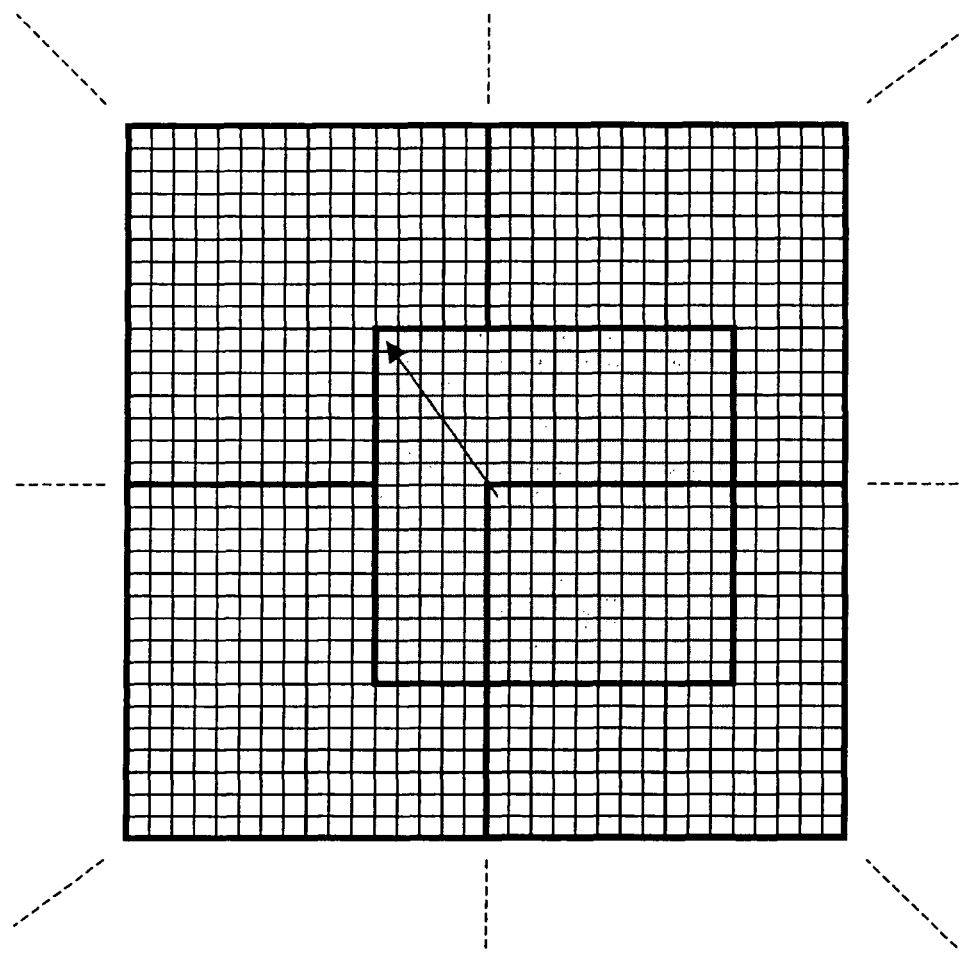
FIG. 5 shows an example of motion vector prediction for a 16×16 partition.

FIG. 4 illustrates an example of a P-picture for a QCIF video (176×144 pixels) with 11×9 macro blocks. As can be see in FIG. 4, a P-picture may include intra macro blocks (I MBs) only allowed to take information from the current picture and predictive macro blocks (P MBs) that may take information from other pictures by prediction. The macro blocks may be divided into even smaller partitions. The illustration in FIG. 4 shows P MB partitions of size 16×16 pixels, 16×8 pixels, 8×16 pixels and 8×8 pixels. The H.264 standard allows for such partitions, sometimes called sub-blocks, down to size 4×4 pixels. Each P MB partition uses a motion vector (MV) pointing at a position in a previously decoded reference picture in order to make the prediction. See FIG. 5 for an example of MV prediction for a 16×16 partition. The video encoder may also choose to save bits by skipping a macro block causing the decoder to simply copy that part from a previously decoded picture.

From the video coding layer, various parameters can be extracted (or derived from extracted parameters) and used by the bitstream quality model for estimating video quality. Examples of such parameters are, but not limited to, frame type, GOP-type, GOP-length, the number of I-, P- and B-frame packets received/lost/discarded, and the number of good/impaired I-, P- and B-frames, motion, macro block information. The parameters may be extracted by a bitstream analyzer.

Apart from the above parameters, other information from the video bitstream can also be used to estimate the video quality. An important aspect of the video quality estimation technique presented in this disclosure is to estimate the error propagation and error visibility of an error in the video from features found in the video coding layer of a bitstream. By doing so, a more accurate video quality estimation score can be calculated.

In the context of the present disclosure, error includes or results from loss or delay of video data, such as a loss or delay of a packet of the video bitstream. However, not all data loss or data delay within a video bitstream will have a human-perceptible impact upon the quality of the video. In other words, not every error will have a subjective visual effect on the end viewers and will be perceived as a visual degradation. For example, the loss of a single B-frame will have little impact because no other frame is dependent upon that frame, and hence the image will only be distorted for the fraction of a second corresponding to the single B-frame. The loss of a reference frame (an I-frame or P-frame), however, will affect any P-frame or B-frame that refers to the reference frame. A series of packet losses—especially those involving reference frames—will start to cause human-perceptible degradations in the video image quality. Furthermore, losses of reference frames at the beginning of a scene change or during high-motion video sequences are more likely to cause human-perceptible distortions than losses of reference frames in relatively static video sequences. Conversely, losses of non-reference frames during scene changes or high-motion video sequences are less likely to produce noticeable distortions because the visual artifact is obscured by the rapid changes in the images presented to the viewer.

Hence, it is not enough to simply detect occurrence of an error in the video bitstream, what is also needed is to assess or estimate how "visible" the error will be to the human viewer. Error visibility (or visibility in short), is a term used to measure this visual impact or effect. The magnitude of the visibility of an error indicates how much or severe the error will affect the human-perceptible quality of the video. One specific way of quantifying the error visibility is the amount of visual degradation of the video caused by the error.

A key characteristic of the video quality estimation technique proposed in this disclosure is to keep track of at least one of a temporal propagation and a spatial propagation of an error. To this end, the technique keeps track of where errors occur in the video, temporally and/or spatially, estimates how long the errors will linger and/or how much they will spread in space (i.e. estimate the error propagation in at least one of time and space) and how visible they are. For example, an error tends to spread spatially when there is a lot of motion and will disappear when an intra picture comes.

Figure 6:
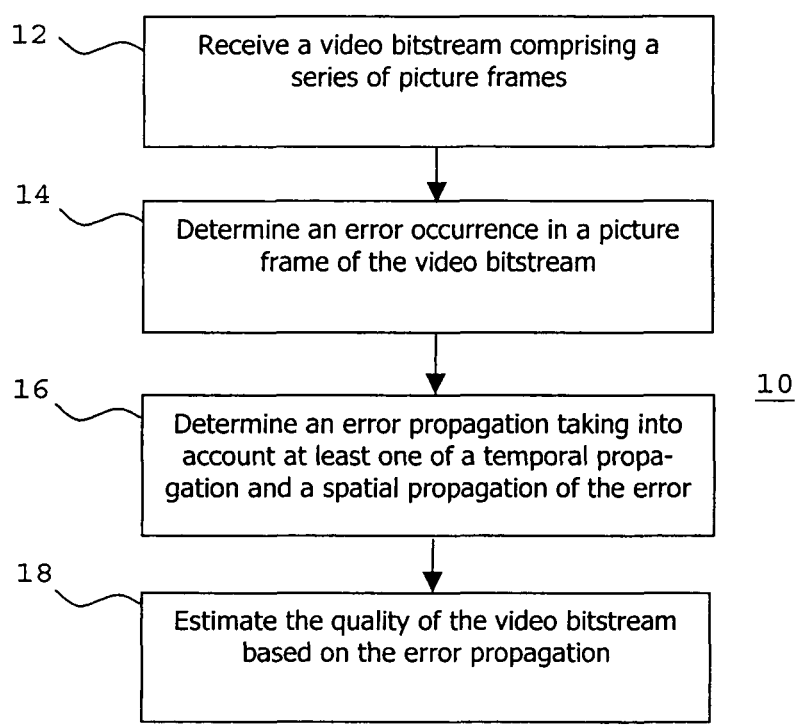
FIG. 6 shows a method embodiment of the video quality estimation technique.

A method embodiment embodying the essential aspect of the video quality estimation technique mentioned above is shown in FIG. 6. Specifically, FIG. 6 depicts an objective video quality estimation method 10 which comprising the following steps: at the initial step 12, a video bitstream comprising a series of picture frames is received; next at step 14, the technique determines an error occurrence in a picture frame of the video bitstream; then at step 16, at least one of a temporal propagation and a spatial propagation of the error is determined; finally at step 18, the quality of the video bitstream is estimated based on the result of the determination.

Figure 7:
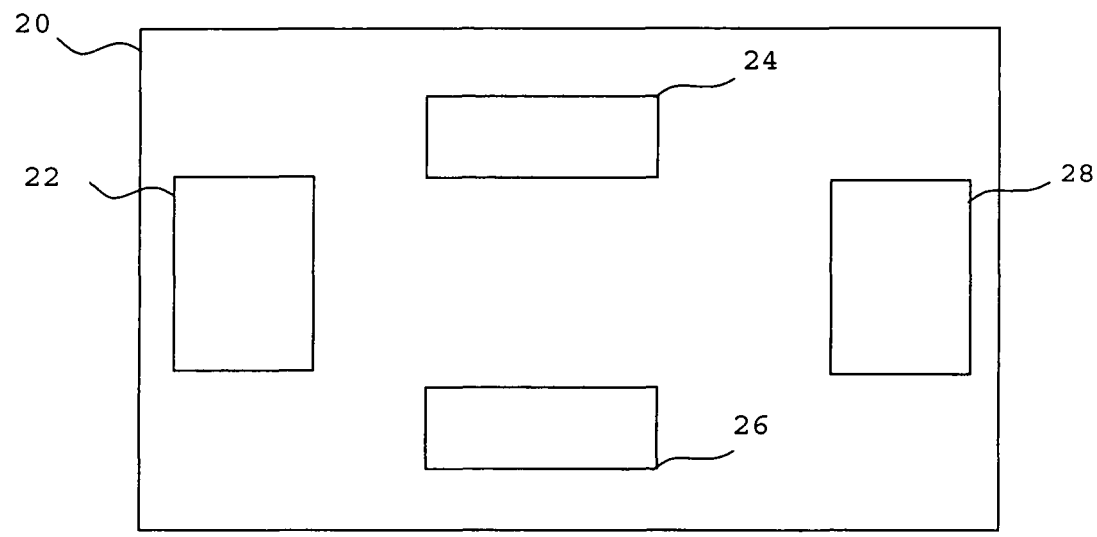
FIG. 7 is a block diagram depicting a device embodiment of the video quality estimation technique.

FIG. 7 depicts a device embodiment for practicing the video quality estimation technique presented in this disclosure. The device, denoted as 20, is adapted to objectively estimating video quality. The device 20 comprises the following components: a receiver 22 adapted to receive a video bitstream comprising a series of picture frames; a first determinator 24 adapted to determine an error occurrence in a picture frame of the video bitstream; a second determinator 26 adapted to determine at least one of a temporal propagation and a spatial propagation of the visual degradation; and an estimator 28 adapted to estimate the quality of the video bitstream based on the result of the determination.

Although the components 22, 24, 26, and 28 are depicted as separate blocks within one housing 20, they may appear differently in real implementation of the device. For example, the functions of some or all of the components may be combined into one single physical unit. For another example, some or all of them may be distributed in different nodes participating in the entire video service.

Figure 8:
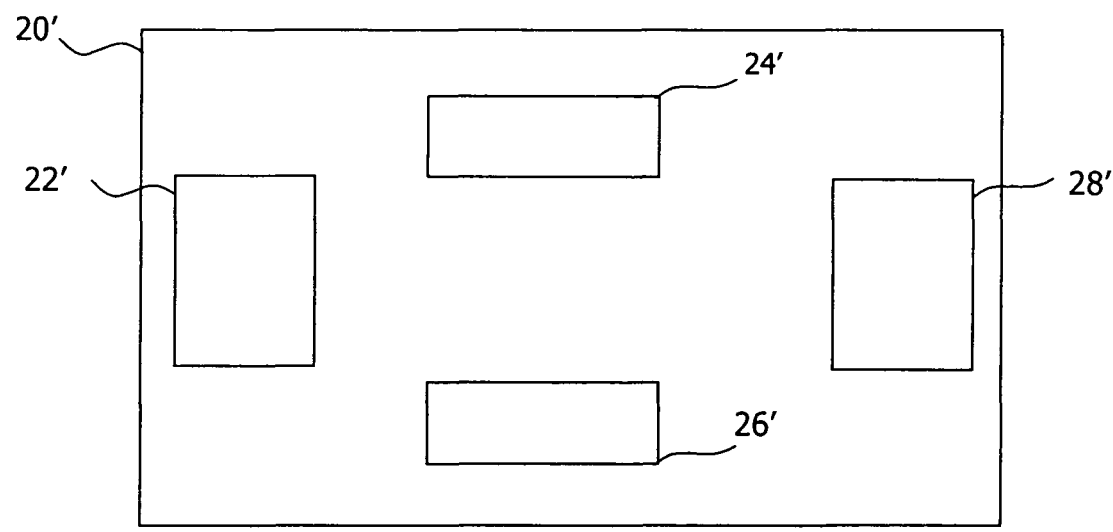
FIG. 8 is a block diagram illustrating a computer program embodiment of the video quality estimation technique.

FIG. 8 is a block diagram illustrating a computer program embodiment of the video quality estimation technique. The computer program, indicated as 20' in FIG. 8, comprises program code portions which when run on a computer cause the computer to perform a number of functions for estimating the video quality. The functions correspond to the steps 12, 14, 16, and 18 comprised in the method embodiment 10 shown in FIG. 6 as well as the components 22, 24, 26, and 28 of the device embodiment as shown in FIG. 7. As specifically shown in FIG. 8, the computer program embodiment 20' comprises a receiver module 22', a first determination module 24', a second determination module 26', and an estimation module 28'.

Figure 9:
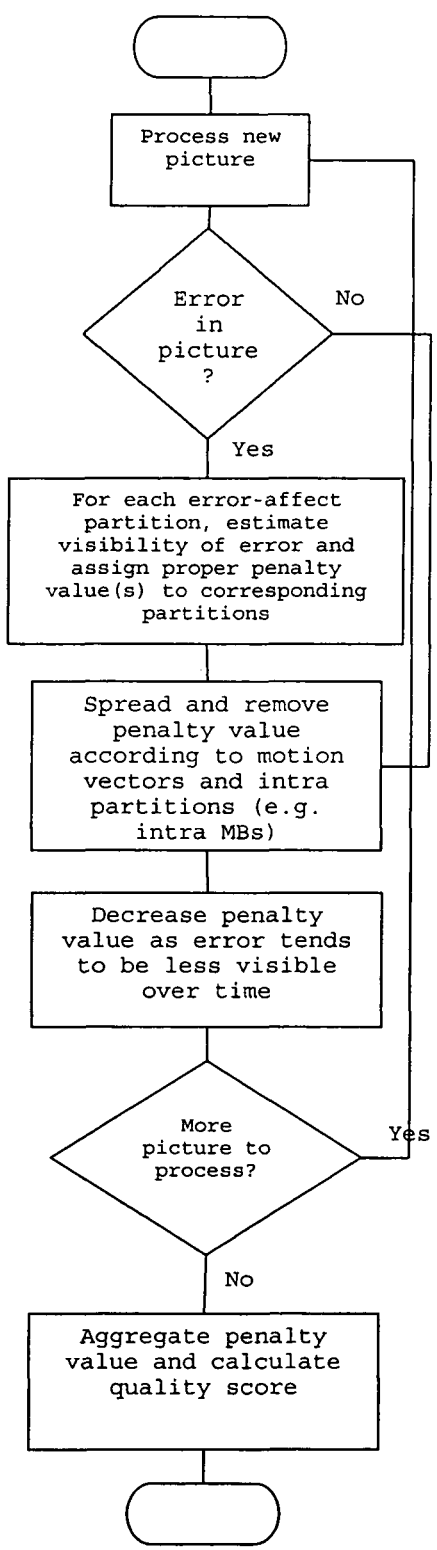
FIG. 9 is a flow chart illustrating another method embodiment of the video quality estimation technique.

FIG. 9 is a flow chart showing another method embodiment of the video quality estimation technique. The steps illustrated in the flow chart are straightforward. The functions associated with the steps can be divided into four parts:

Tracking the error propagation of an error, i.e. tracking at least one of a temporal propagation and a spatial propagation of the error;

Estimating the error visibility of an error for each error-affected position, e.g., for each error-affected pixel or partition (such as a macro block) in the video;

Aggregating the penalty calculated for all erroneous parts of the video; and

Combining the aggregated penalty value with perhaps consideration of other parameters to form a quality score for the video bitstream.

The four parts are described in detail below.

Tracking Error Propagation

A simple way of accounting for an error such as a data loss in a video bitstream is to calculate the loss ratio. For example, the loss ratio can be calculated as the amount of lost macro over the total number of blocks. However, this metric may not properly represent the visibility of the error.

To more properly estimate the propagation, or spread, of the error in at least one of time and space, the technique presented herein makes use of the information on motion vectors. For instance, a video bitstream comprising a series of picture frames may comprise at least one reference picture and at least one prediction picture, wherein the prediction picture may comprise at least one motion vector pointing at a position in a reference picture; accordingly, the technique keeps track on motion vectors. The technique may also keep track on motion vectors and reference pictures of which the motion vectors point at.

An error will also propagate in time whenever there is a skipped partition or skipped frame following an error as the error of the previous partition or frame is then copied to the current partition or frame. Moreover, an error may propagate in space for certain cases of intra prediction (e.g., intra-frame or intra-partition prediction). Intra prediction does not use motion vectors, but predicts from surrounding pixels in adjacent partitions (e.g., surrounding macro blocks). A codec usually contains a number of different ways of how to perform the intra prediction from the surrounding pixels. In H.264 intra macro blocks (i.e., intra-coded macro blocks) may predict from non-intra macro blocks within the current frame. If an error has propagated into a non-intra macro block and the intra macro block predicts from this non-intra macro block, the error may propagate to the intra macro block. To prevent intra prediction from non-intra macro blocks in H.264 the constrained_intra_pred_flag can be set at the cost of coding efficiency.

The propagation of error can be presented in a loss penalty map. In one embodiment, the propagation of error can be stored in a loss penalty map.

Estimating Error Visibility

Considering the spread effect, the error which occurs in one picture frame may affect one or more partitions in one or more picture frames. Hence, the technique needs to consider all the affected picture frames or partitions when determining the error visibility, or visual degradation caused by the error. One embodiment of the technique determines the visual degradation by calculating a penalty value for each error-affected partition in the video. The penalty value is a value indicative of amount of the visual degradation caused by the error.

To determine how visible an error is, different rules can be deployed:

An error, such as a data loss, which occurs during a scene change typically looks worse than an ordinary error and should therefore be assigned with a higher penalty value. It may not be enough to only detect intra frames as they can be inserted anywhere as random access points. A loss in an intra frame but not in a scene change will likely not look as bad as a loss in a scene change.

An error, such as a data loss, tends to look bad if there is a lot of motion directly after the error. More specifically, it is the relative magnitude of the motion that is interesting. For example, a small motion loss in an otherwise motionless scene will likely be more apparent than a medium motion loss in a high-motion scene.

If the partition, e.g., a macro block, in the picture after a lost partition, e.g. a macro block, is a skip, the probability is high that the lost macro block also would have been a skip. These types of macro blocks are therefore not given a loss penalty. However, this may not apply when there is a scene change, as the lost macro block then most likely is not a skip.

An error tends to disappear over time. The penalty value is therefore decreased by a specific amount or factor for at least one of the picture frames subsequent to the frame where the error occurs. As a specific implementation, the penalty value is decreased by a specific amount or factor for each subsequent frame.

The penalty value is reset when there are intra-coded picture frames or partitions. However, if an intra-coded partition following an intra-coded partition has a motion vector pointing at a reference picture preceding the intra-coded partition, the error may return.

Each of the above rules, as well as any other rule, may be selectively used in the video quality estimation technique presented in this disclosure.

Motion of a picture frame may be used to determine the penalty value for the error. When doing so, it is important that the motion vectors used are those which represent actual motion and are not just pointing "randomly" at a best prediction. The random pointing motion vectors should not be considered when determining the magnitude of the penalty value. In order to determine whether a motion vector in a partition, e.g., a macro block, is "random", all motion vectors of the surrounding partitions are checked. The motion vector in question is regarded to be random if it is not equal, or substantially equal (i.e. plus/minus a constant) to at least one surrounding motion vector.

Figure 10:
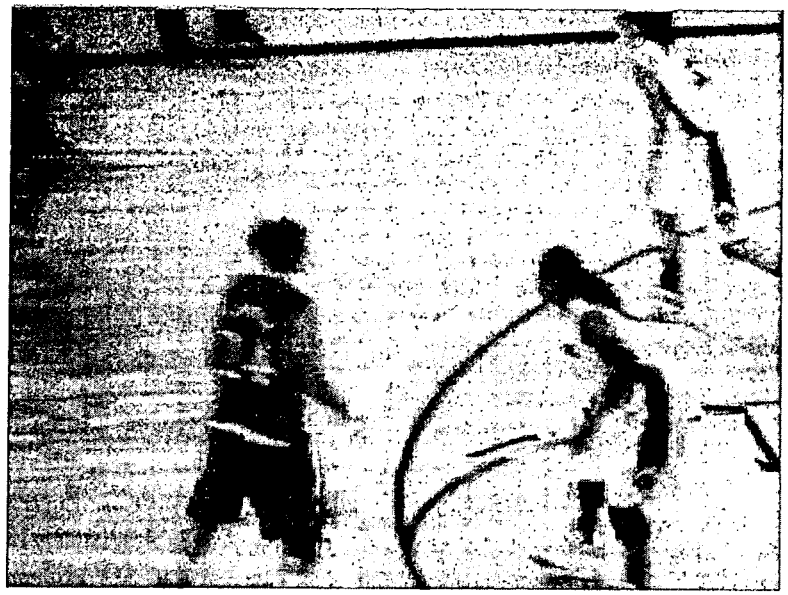
FIG. 10 is a video screen shot showing an example of a packet loss in the video.
Figure 11:
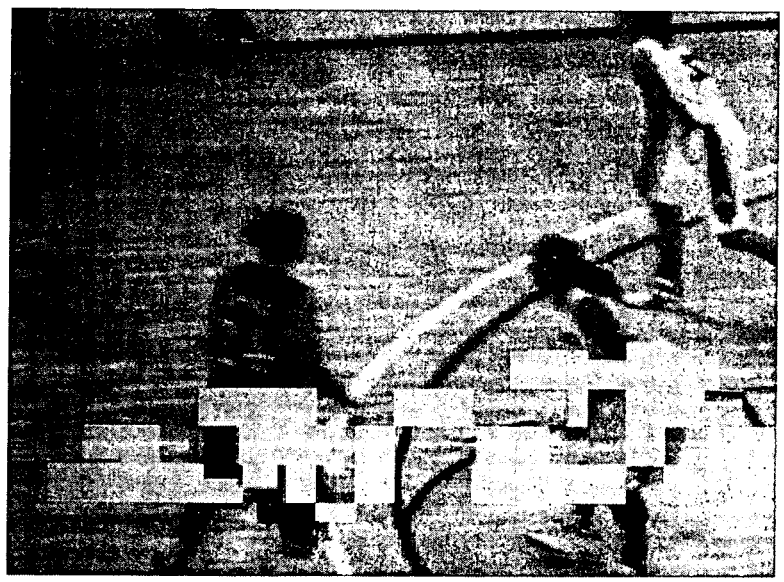
FIG. 11 is a video screen shot showing shows the same example of FIG. 8 with a loss penalty map as overlay.

Both the location (e.g., the x-y position of the error in the picture frame) and visibility of an error can be presented in the loss penalty map. For full fidelity of the error propagation the loss penalty map needs to have the same resolution as the decoded pixel map, e.g. 176×144 values. An example of a packet loss in video is shown in FIG. 10. The same example with the loss penalty map as overlay is illustrated in FIG. 10. Generally, the loss penalty map can take the form of a two-dimensional data structure defining individual data fields, wherein each data field is configured to allow the storing of a penalty value. One example, the data structure can be arranged in the form of a table.

Figure 12:
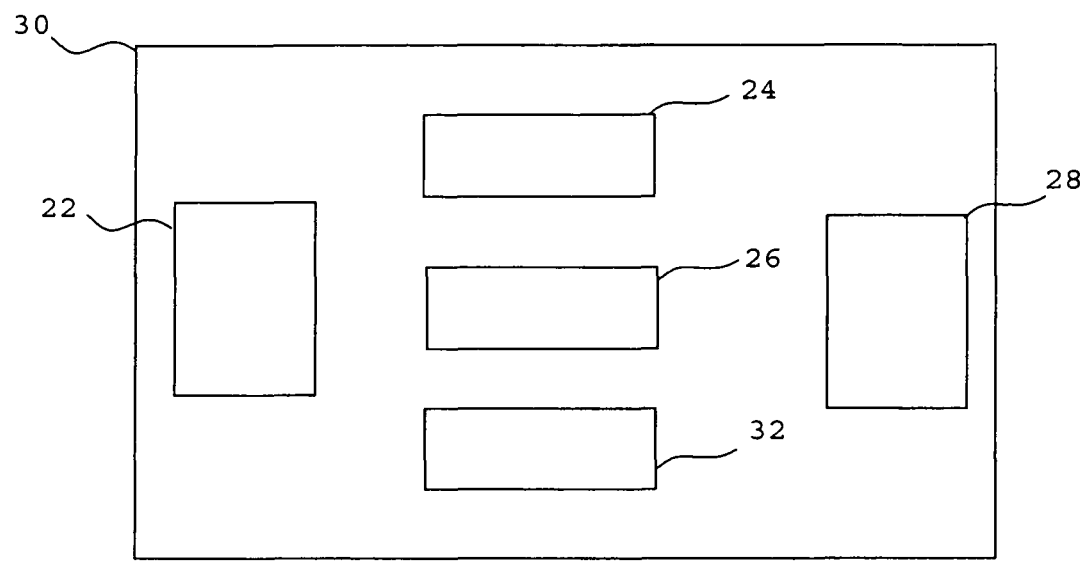
FIG. 12 is a block diagram depicting another device embodiment of the video quality estimation technique.

FIG. 12 shows a device embodiment 30 of the video quality estimation technique presented herein. Compared with the device embodiment 20 shown in FIG. 7, device 30 comprises an additional component, namely a collecter 32. The collecter 32 is adapted to collect the visual degradation in a loss penalty map.

Figure 13:
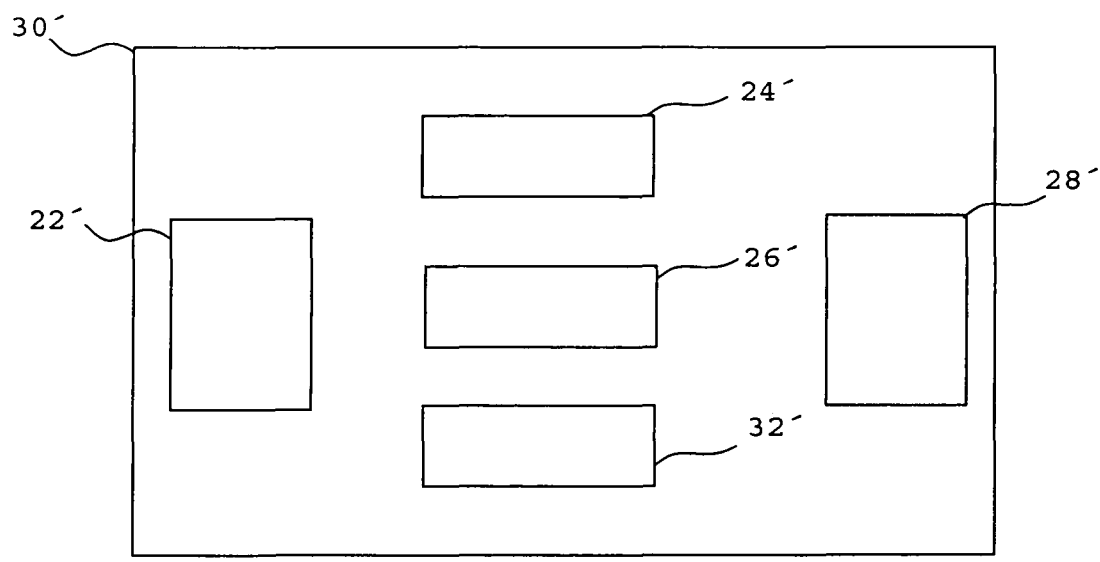
FIG. 13 is a block diagram illustrating another computer program embodiment of the video quality estimation technique.

Correspondingly, a computer program embodiment 30' of the video quality estimation technique is provided as shown in FIG. 13. Compared with the computer program embodiment 20' shown in FIG. 8, computer program 30' comprises an additional module, namely a collector module 32' for collecting the visual degradation in a loss penalty map.

To keep the complexity of the technique down, the penalty value may in certain embodiments be calculated at a lower resolution than the decoded pixel map. For instance, the resolution of the loss penalty map could be the same as the resolution of the macro blocks, such as 11×9 for QCIF. One way to estimate the spread of the penalty value for the lower resolution case is to weight the values of the previous penalty value accordingly. For the example in FIG. 5 with the motion vector $(x,y)=(-5,7)$ the penalty value for the bottom right block of the four blocks in the current picture can be calculated as:

penalty=(5×7)/(16×16)×penalty value of previous top-left block+(11×7)/(16×16)×penalty value of previous top-right block+(5×9)/(16×16)×penalty value of previous bottom-left block+(11×9)/(16×16)×penalty value of previous bottom-right block Certain knowledge of the type of concealment that will be used in the decoder will make the estimation of the error visibility more accurate. Possible concealment methods for predictive pictures include:

Copying lost parts from previous decoded picture;
Copying lost parts from previous decoded picture based on motion;
Freezing the entire video until a next random access point (intra frame).

The video quality estimation technique presented herein can be designed to be applicable for at least the two top concealment methods and similar ones.

In the case of using the freezing method, the error visibility impact can be calculated from the time it takes between each error and the next random access point. The amount of motion of the scene is also a parameter that may affect the visibility of the freeze.

Possible concealment methods for I-pictures include the three concealment methods above as well as interpolating/extrapolating lost macro blocks from correctly received macro blocks in the same I-picture. If the I-picture is located in a scene change, the interpolating/extrapolating" method may produce a better result than the two top concealment methods since it prevents the decoder from copying pixels from the previous scene. However, when this concealment method is used for I-pictures not in a scene change, it may not be as good as the two top concealment methods.

In some scenarios it is possible that information about the concealment method in the decoder is already known or that it can be signaled to the video quality estimation model from the client terminal.

Aggregating Penalty Value

It is not enough to only estimate where the errors occur and affect and how severe they are. In order to provide an overall quality score (i.e., quality estimate) for the entire video bitstream the penalty value must be aggregated over at least one of time and space.

Figure 14:
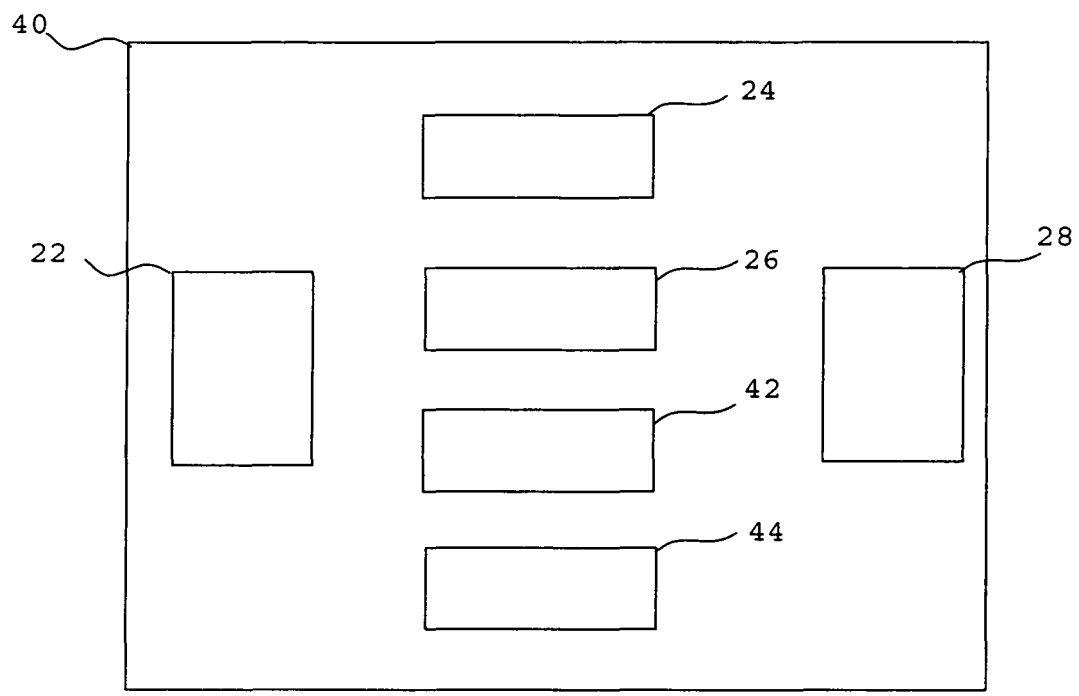
FIG. 14 is a block diagram depicting a further device embodiment of the video quality estimation technique.

FIG. 14 depicts a third device embodiment 40 of the video quality estimation technique presented herein. Compared with the device embodiment 20 shown in FIG. 7, device 40 comprises two additional components, namely an aggregator 42 and a calculator 44. The aggregator 42 is adapted to aggregate the visual degradation caused by the error over at least one of time and space. The calculator 44 is adapted to calculate a score indicative of the quality of the video bitstream based on result of the aggregation.

Figure 15:
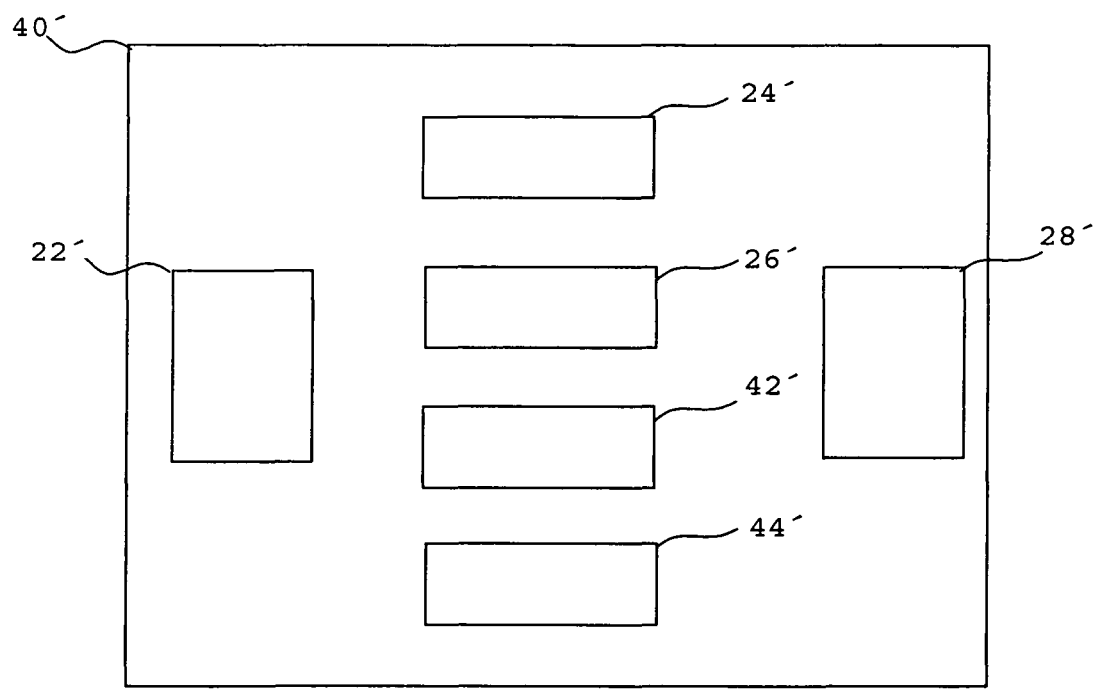
FIG. 15 is a block diagram illustrating a further computer program embodiment of the video quality estimation technique.

Corresponding to third device embodiment 40, a computer program embodiment 40' of the video quality estimation technique is provided as shown in FIG. 15. Compared with the computer program embodiment 20' shown in FIG. 8, computer program 40' comprises two additional modules, namely an aggregating module 42' and a calculating module 44'. The aggregating module 42' serves to aggregate the visual degradation caused by the error over at least one of time and space, and the calculating module 44' functions to calculate a score indicative of the quality of the video bitstream based on result of the aggregation.

Weighting affected partitions and pictures in a uniform way is one approach of aggregation, but it may not be optimal in certain cases, particularly in those where even a small error may significantly ruin the quality. In such cases, it may be more proper to weight the penalty value, or visual degradation, at a higher factor for small penalty value than for large penalty value. A specific embodiment of this approach is to weight penalty value per area/duration higher for small penalty values than large penalty values.

Various functions can be used to model the latter aggregation approach. An example of an easily-fitted function used for this purpose is the bounded log-function of the following form:

$$f = \frac{1}{d}\log_{10}(1 + x \cdot (10^d - 1)) : x \in [0, 1]$$

Figure 16:
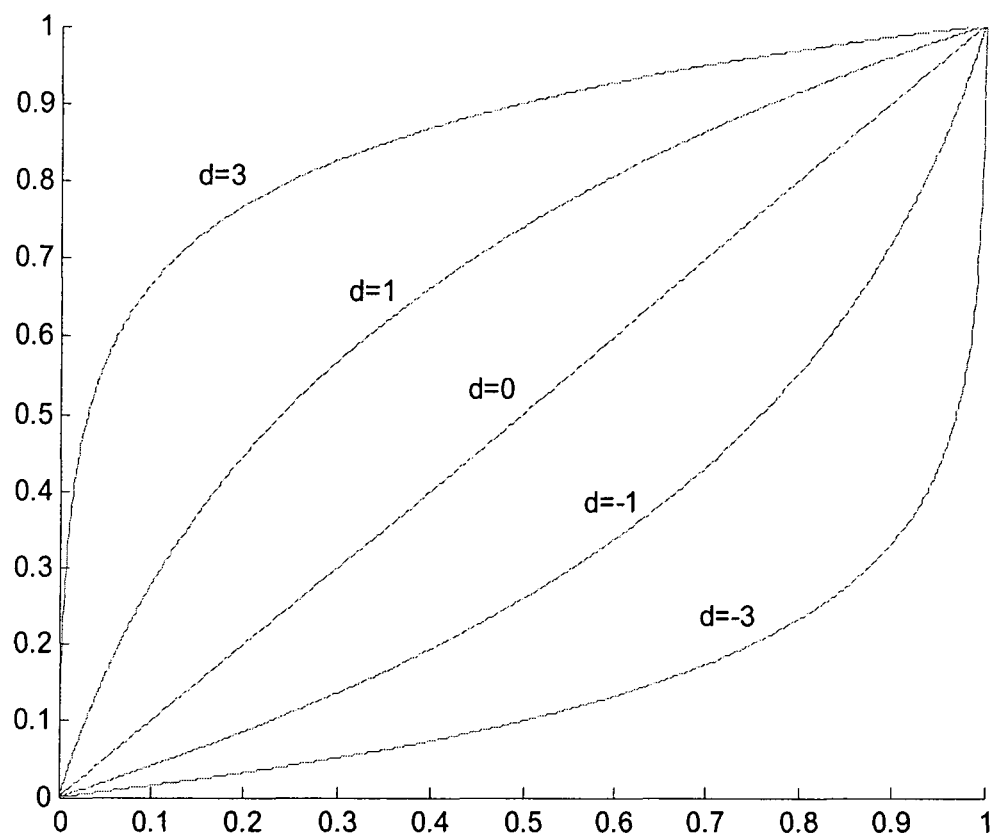
FIG. 16 shows a bounded log-function with various values for d wherein the function is used for modeling penalty value aggregation according to an embodiment of the video quality estimation technique.

The function with various values for d is plotted in FIG. 16.

Alternatively, polynomial functions (e.g., third degree polynomials) or discrete threshold functions fitted to a sampled data set, can be used for modeling the aggregation.

All the exemplary functions listed above can produce satisfactory results. An important point is probably to use a function with decreasing derivative as for d>0 in the above bounded log-function.

The aggregation may be performed stepwise in time. For example, penalty value may be added for each second (corresponding to e.g., 25 picture frames) uniformly to give a "sub-result", and then another function is used to take into account these sub-results.

Forming Quality Score

The aggregated penalty may be one of several parameters contributing to a bitstream quality model score estimating the subjectively perceived quality of a video bitstream. Some of the other parameters of interest may include radio network parameters such as radio Block Error Rate (BLER), Bit Error Rate (BER) and radio bearer used, transport network parameters such as packet loss, data throughout, packet jitter data, packet jitter buffer strategy, IP packet size and RTP/RTCP signaling CRC error ratio (from H.223 de-multiplexer), number of CRC errors, video bitrate, number of bits per video frame; and parameters extracted or derived from the video layer such as target video frame rate, video resolution, video codec, video codec profile, video codec level, quantizer parameter, actual video frame rate, number of video segments (GOBs, slices, video packets) per frame, type of picture (intra or inter picture), number of intra macro-blocks per picture, intra refresh strategy (from educated guess), average/min/max quantizer per picture, number of macro blocks per segment, average/max/min absolute motion vectors, existence and distribution of intra partitions, existence and distribution of inter partitions, existence and distribution of skipped macro blocks, existence and distribution of motion vector resolutions, information about number of used reference pictures.

The bitstream model could for example be a linear model of the form $$MOS_{est} = c_0 + c_1 p_0 + c_2 p_1 + \ldots + c_{n+1} p_n$$

or a geometrical model of the form $$MOS_{est} = c_0(c_1 - c_2 p_0)(c_3 - c_4 p_1) \ldots (c_{2n+1} - c_{2n+2} p_n)$$

or a combination of the two. The model could also be of some other non-linear shape.

The quality score can be calculated periodically with a given time period, e.g., 10 seconds. The score can also be calculated using a sliding window approach, where a new score for a predefined time duration is calculated at a predefined rate. For instance, a new score for a certain window size, e.g., corresponding to 10 seconds, is calculated at a certain rate, e.g., one per picture or one per two seconds. For the penalty value this may require that an aggregated penalty is kept for each picture.

The video quality estimation technique presented above can model the visual impact of an error in video more properly than parametric models. This in turn improves the accuracy of the video quality estimation. In addition, the technique presented in the current disclosure is less complex and less time- and resource-consuming than perceptual models which have to, among others, decode the video and search for visible errors in the pixel data of the decoded video.

While the technique has been described with reference to the above embodiments, it is to be understood that the description is for explanation purposes only. Accordingly, it is intended that the invention be limited only by the scope of the claims appended hereto.

The invention claimed is:

1. A video quality estimation method, comprising:
receiving an encoded video bitstream comprising a series of picture frames;
determining, from the encoded video bitstream, that an error has occurred in a macro block in one of the picture frames of the encoded video bitstream;
keeping track of a temporal propagation of the error that has occurred in the macro block by using intra prediction based on the encoded video bitstream that relates to the macro block affected by the error in response to determining that the error has occurred; and
determining, from the encoded video bitstream, a visual degradation caused by the error based on keeping track of the temporal propagation of the error that has occurred in the macro block by determining a penalty value for the macro block affected by the error, wherein the penalty value is indicative of an amount of the visual degradation caused by the error that has occurred in the macro block,
wherein the penalty value is calculated based on the encoded video bitstream according to one or more of the following rules:
assigning a higher penalty value to the error if the error occurs in a scene change;
assigning a higher penalty value to the error if the encoded video bitstream comprises motion data directly after an error-affected picture frame and if a relative magnitude of the motion is large;
assigning no penalty value to the error for the macro block if the macro block is a skip or is an estimated skip, unless there is a scene change or an estimated scene change;
decreasing the penalty value assigned to the error for at least one subsequent picture frame by a predetermined amount or factor; and
resetting the penalty value upon reception of an intra-coded macro block or an intra-coded picture frame.

2. The method according to claim 1, wherein the error occurs at or affects a plurality of picture frame partitions in the one of the picture frames, and wherein determining the visual degradation comprises calculating a separate penalty value for each of the plurality of partitions as a value indicative of an amount of the visual degradation caused by the error.

3. The method according to claim 1,
wherein the series of picture frames comprises a reference picture frame and a prediction picture frame, and
wherein the prediction picture frame comprises a motion vector pointing at a position in the reference picture, and
wherein the temporal propagation of the error is determined based on the motion vector information including the motion vector.

4. The method according to claim 3, wherein keeping track of the temporal propagation of the error comprises keeping track of the temporal propagation of the error by using the motion vector information including the motion vector and the reference picture which the motion vector points at, and wherein the motion vector relates to the macro block affected by the error.

5. The method according to claim 1, further comprising:
collecting the visual degradation in a loss penalty map, wherein the loss penalty map has the same resolution as the associated picture or a lower resolution than the picture.

6. The method according to claim 5, wherein the picture frame comprises a plurality of partitions arranged in the form of a partition map, and the loss penalty map has the same resolution as the partition map.

7. The method according to claim 1, wherein keeping track of the temporal propagation of the error comprises weighting a visual degradation for a previous error.

8. The method according to claim 1, further comprising:
aggregating the visual degradation caused by the error over at least one of time and space; and
based on a result of the aggregation, calculating a score indicative of quality of the encoded video bitstream, wherein calculating the score comprises calculating the score periodically or using a sliding window approach where a new score for a predefined time duration is calculated at a predefined rate.

9. The method according to claim 1, wherein the encoded video bitstream comprises at least a portion of a video coding layer, wherein the video coding layer comprises one or more parameters, and wherein determining that the error has occurred is based on at least one of the parameters.

10. A computer program product comprising a non-transitory computer-readable recording medium and program code portions, which when run on a computer cause the computer to perform the method of claim 1, stored on the non-transitory computer-readable recording medium.

11. The method of claim 1, wherein keeping track of the temporal propagation of the error comprises determining an error propagation of the error based on keeping track of the temporal propagation of the error, wherein determining the error propagation comprises determining the error propagation of the error from a partition of the one of the picture frames into other partitions of the one of the picture frames or into other ones of the picture frames.

12. The method according to claim 1, further comprising:
determining whether the encoded video bitstream comprises motion directly after the error occurs; and
assigning a higher penalty value to the error in response to determining that the encoded video bitstream comprises motion directly after the error occurs, wherein the higher penalty value factors into an overall quality score for the encoded video bitstream.

13. The method according to claim 1, further comprising visually presenting a position of the error in the one of the picture frames in a loss penalty map.

14. The method according to claim 1, wherein keeping track of a temporal propagation of the error comprises determining an error propagation of the error by keeping track of the temporal propagation of the error using the intra prediction that relates to the macro block affected by the error in response to determining that the error has occurred, the method further comprising:
estimating a quality of the encoded video bitstream based on the error propagation.

15. The method according to claim 1, wherein keeping track of a temporal propagation of the error comprises determining an error propagation of the error by keeping track of the temporal propagation of the error using the intra prediction that relates to the macro block affected by the error in response to determining that the error has occurred, the method further comprising:
estimating a quality of the encoded video bitstream based on the error propagation and based on the visual degradation.

16. The method according to claim 1, wherein the penalty value is calculated by assigning no penalty value to the error for the macro block responsive to the macro block being a skip or an estimated skip.

17. A video quality estimation method, comprising:
receiving a video bitstream comprising a series of picture frames;
determining that an error has occurred in a macro block in one of the picture frames of the video bitstream;
keeping track of at least one of a temporal propagation and a spatial propagation of the error that has occurred in the macro block by using at least one of motion vector information and intra prediction that relates to the macro block affected by the error in response to determining that the error has occurred; and
determining a visual degradation caused by the error based on keeping track of the at least one of the temporal propagation and the spatial propagation of the error that has occurred in the macro block by determining a penalty value for the macro block affected by the error, wherein the penalty value is indicative of an amount of the visual degradation caused by the error that has occurred in the macro block,
wherein the penalty value is calculated according to one or more of the following rules:
assigning a higher penalty value to the error if the error occurs in a scene change;
assigning a higher penalty value to the error if the video bitstream comprises motion data directly after an error-affected picture frame and if a relative magnitude of the motion is large;
assigning no penalty value to the error for the macro block if the macro block is a skip or is an estimated skip, unless there is a scene change or an estimated scene change;
decreasing the penalty value assigned to the error for at least one subsequent picture frame by a predetermined amount or factor; and
resetting the penalty value upon reception of an intra-coded macro block or an intra-coded picture frame;
aggregating the visual degradation caused by the error over at least one of time and space; and
based on a result of the aggregation, calculating a score indicative of quality of the video bitstream, wherein aggregating the visual degradation comprises weighting the visual degradation at a higher factor for small visual degradation than for large visual degradation.

18. A device for estimating video quality, the device comprising:
a receiver configured to receive an encoded video bitstream comprising a series of picture frames; and
at least one processor configured to:
determine, from the encoded video bitstream, that an error has occurred in a macro block in one of the picture frames of the encoded video bitstream;
keep track of a temporal propagation of the error that has occurred in the macro block by using intra prediction based on the encoded video bitstream that relates to the macro block affected by the error in response to determining that the error has occurred; and
determine, from the encoded video bitstream, a visual degradation caused by the error based on keeping track of the temporal propagation of the error that has occurred in the macro block by determining a penalty value for the macro block affected by the error, wherein the penalty value is indicative of an amount of the visual degradation caused by the error that has occurred in the macro block,
wherein the penalty value is calculated based on the encoded video bitstream according to one or more of the following rules:
assigning a higher penalty value to the error if the error occurs in a scene change;
assigning a higher penalty value to the error if the encoded video bitstream comprises motion data directly after an error-affected picture frame and if a relative magnitude of the motion is large;
assigning no penalty value to the error for the macro block if the macro block is a skip or is an estimated skip, unless there is a scene change or an estimated scene change;
decreasing the penalty value assigned to the error for at least one subsequent picture frame by a predetermined amount or factor; and
resetting the penalty value upon reception of an intra-coded macro block or an intra-coded picture frame.

19. The device according to claim 18, wherein the error occurs at or affects a plurality of picture frame partitions in the one of the picture frames, and wherein the at least one processor is further configured to determine the visual degradation by calculating a separate penalty value for each of the plurality of partitions as a value indicative of an amount of the visual degradation caused by the error.

20. The device according to claim 18,
wherein the series of picture frames comprises a reference picture frame and a prediction picture frame, and
wherein the prediction picture frame comprises a motion vector pointing at a position in the reference picture frame, and
wherein the at least one processor is further configured to determine the temporal propagation of the error based on the motion vector information including the motion vector.

21. The device according to claim 18, wherein the at least one processor is further configured to:
collect the visual degradation in a loss penalty map, wherein the loss penalty map has the same resolution as the associated picture or a lower resolution than the picture.

22. The device according to claim 18, wherein the at least one processor is further configured to:
aggregate the visual degradation caused by the error over at least one of time and space; and
calculate a score indicative of quality of the encoded video bitstream based on a result of the aggregation.

23. A server node for providing an encoded video bitstream, the server node comprising the device according to claim 18.

24. A client terminal for decoding an encoded video bitstream, the client terminal comprising the device according to claim 18.

25. A network node for communication between a video server node and a video client terminal, the network node comprising the device according to claim 18.

26. The device according to claim 20, wherein keeping track of the temporal propagation of the error comprises keeping track of the temporal propagation by using the motion vector information including the motion vector and the reference picture which the motion vector points at, and wherein the motion vector relates to the macro block affected by the error.

27. The device according to claim 18, wherein the penalty value is calculated by assigning no penalty value to the error for the macro block responsive to the macro block being a skip or an estimated skip.

* * * * *

UNITED STATES PATENT AND TRADEMARK OFFICE
CERTIFICATE OF CORRECTION

PATENT NO. : 10,728,538 B2
APPLICATION NO. : 13/521172
DATED : July 28, 2020
INVENTOR(S) : Pettersson et al.

It is certified that error appears in the above-identified patent and that said Letters Patent is hereby corrected as shown below:

On the Title Page

Item (75), under "Inventors", in Column 1, Line 2, delete "Malmo (SE)" and insert -- Malmö (SE) --, therefor.

In the Specification

In Column 1, Line 56, delete "Based the" and insert -- Based on the --, therefor.

In Column 6, Line 32, delete "is block" and insert -- is a block --, therefor.

In Column 6, Line 54, delete "overlay; and" and insert -- overlay; --, therefor.

In Column 7, Line 54, delete "is block" and insert -- is a block --, therefor.

In Column 8, Line 5, delete "computer." and insert -- computer, --, therefor.

In Column 8, Line 63, delete "see" and insert -- seen --, therefor.

In the Claims

In Column 17, Line 31, in Claim 17, delete "occurred; and" and insert -- occurred; --, therefor.

Signed and Sealed this
Fifth Day of January, 2021

Andrei Iancu
*Director of the United States Patent and Trademark Office*